United States Patent Office 3,266,728
Patented August 16, 1966

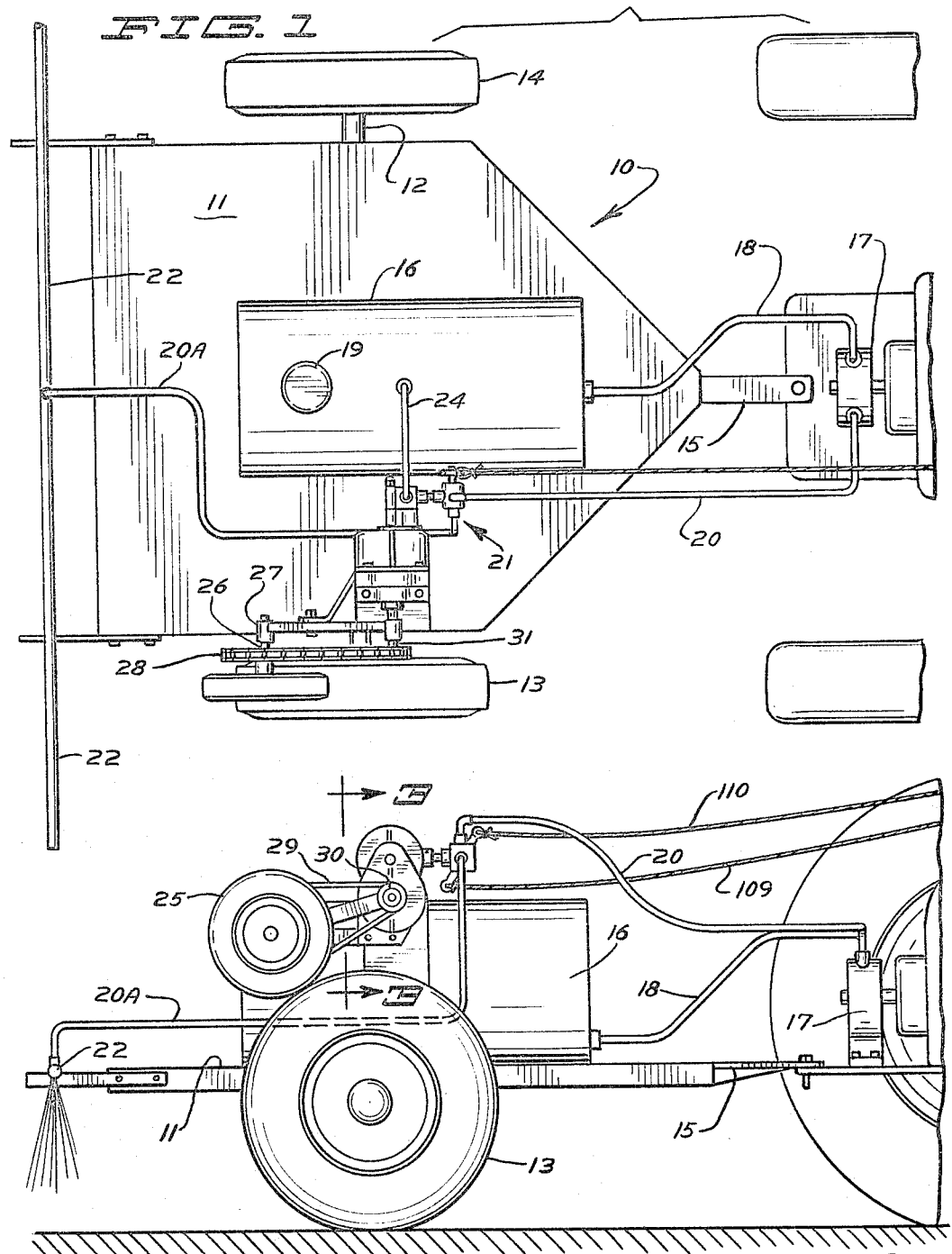

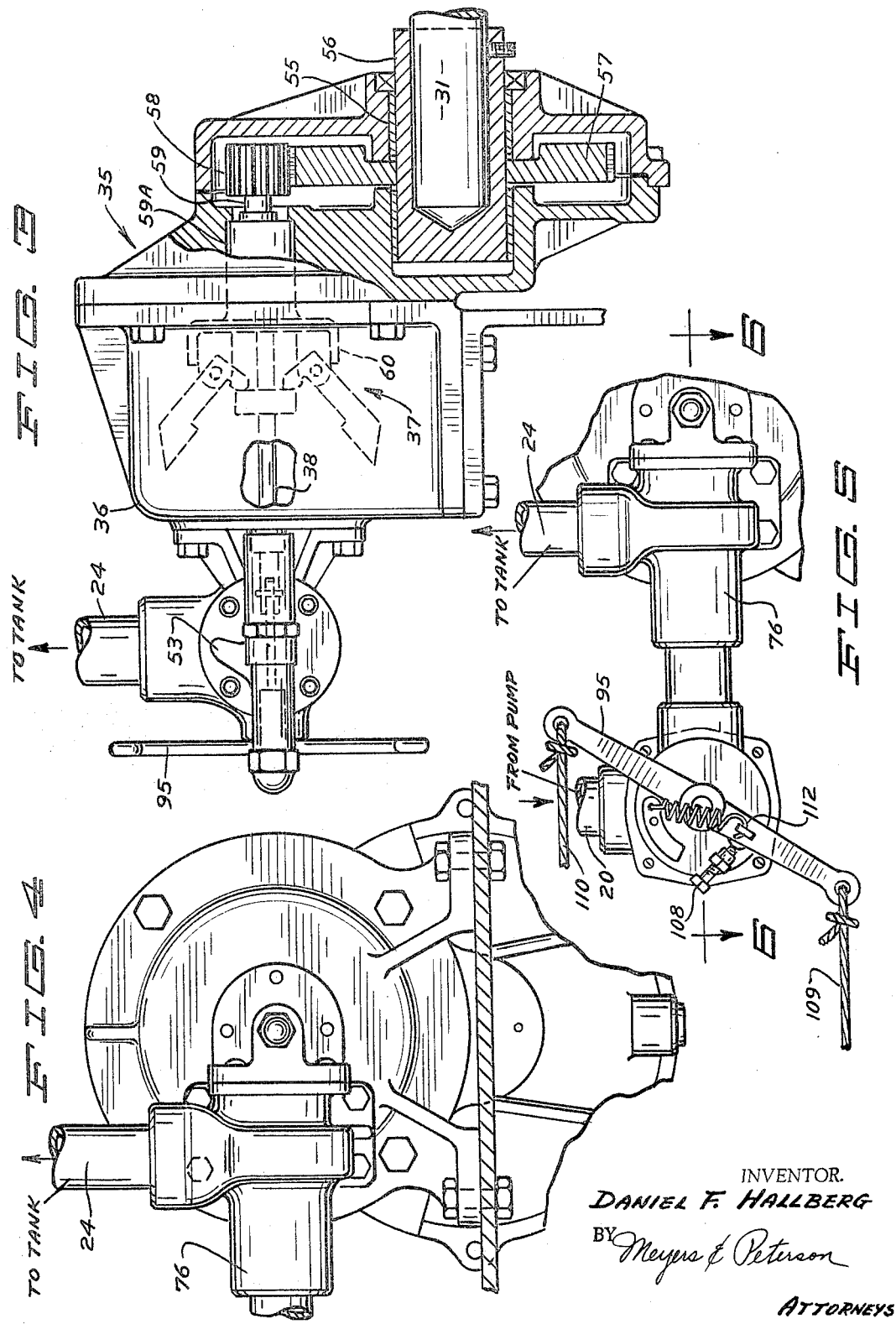

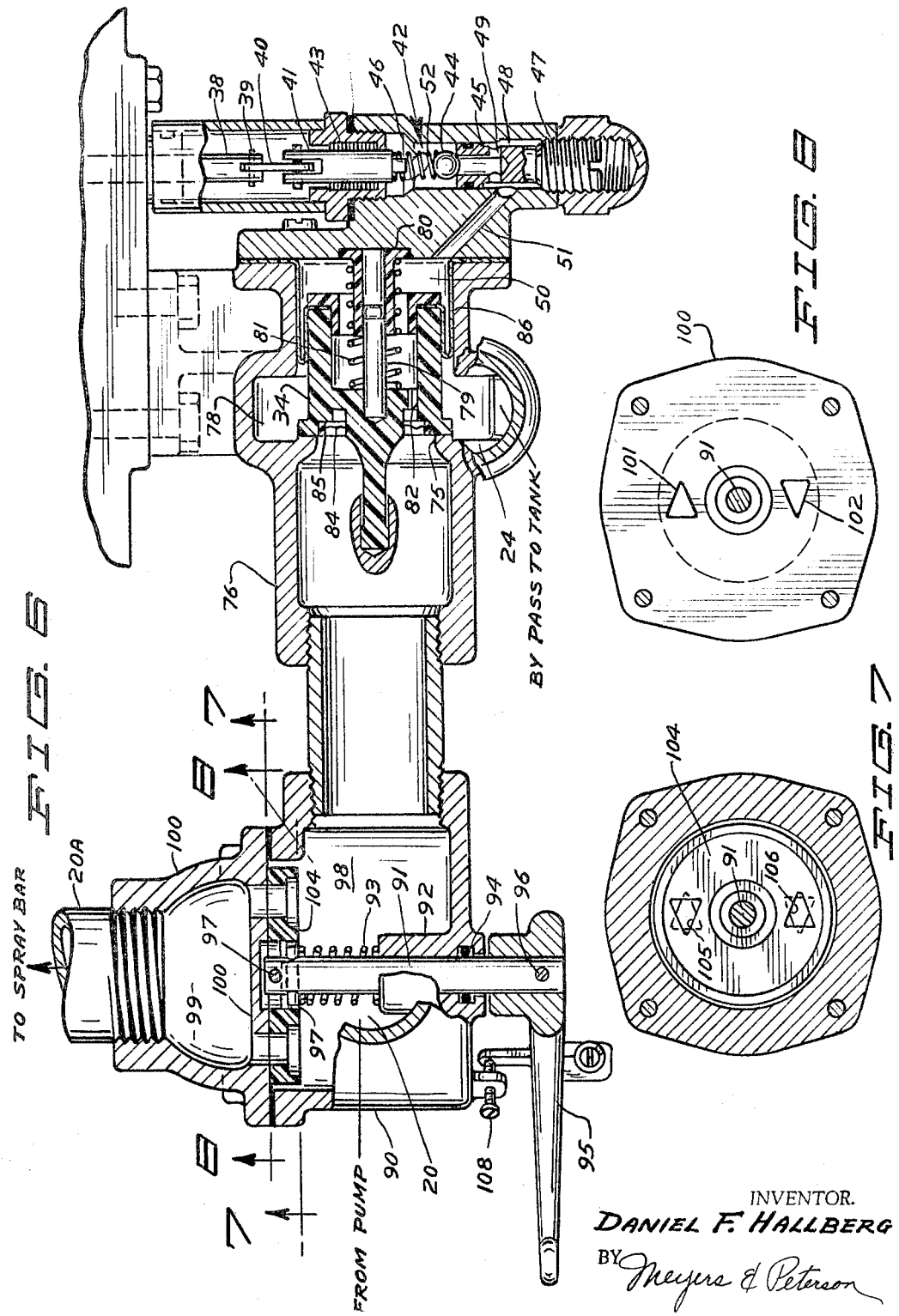

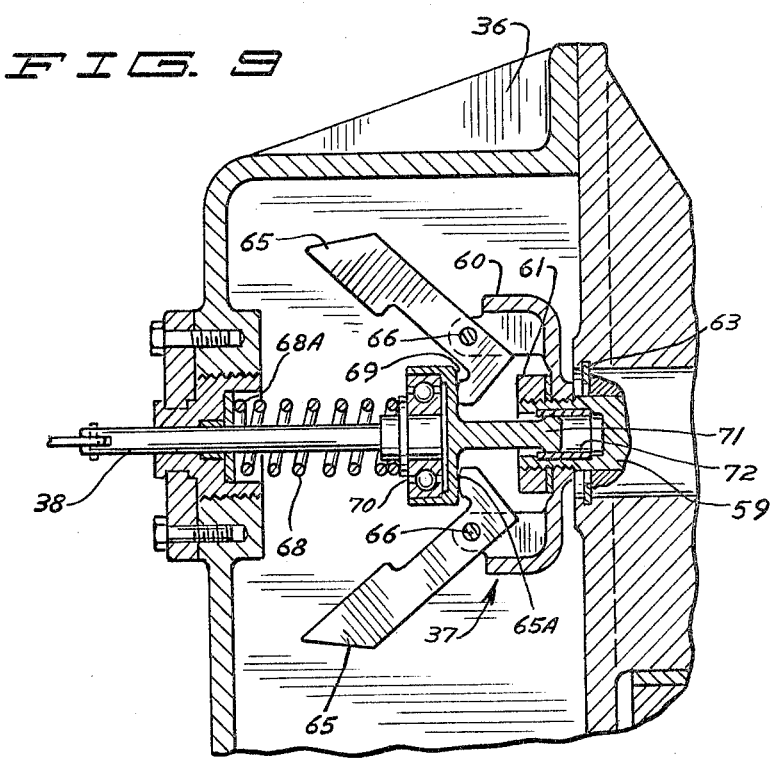

3,266,728
CONTROL AND BY-PASS VALVE UNIT FOR AREA SPRAY SYSTEM
Daniel F. Hallberg, Minneapolis, Minn., assignor, by mesne assignments, to Hypro, Inc., Minneapolis, Minn., a corporation of Ohio
Filed Jan. 28, 1964, Ser. No. 340,653
12 Claims. (Cl. 239—155)

The present invention relates generally to a system which is adapted to apply fluids over a surface to be treated with a uniform rate of coverage, the system accommodating changes in relative speed between the applicating equipment and the surface being treated so as to render the output of the system variable and in accordance with the relative rate of speed between the applicating equipment and the surface being treated. The area applicating equipment system of the present invention includes a further adjustable feature in combination with the speed adjustment provision which permits different basic rates of application of various fluids with only one set of discharge or spray nozzles.

The apparatus is adaptable to conveyor systems wherein the treatment surface moves, and is particularly adapted for use with systems wherein the spray equipment moves, such as in soil treatment operations. In the application of fluid soil treating materials, such as fumigates, insecticides, fertilizers, herbicides and the like, while in liquid state, whether or not in an emulsion form, suspension form or true solution, the rate of application is generally extremely critical. For example, excessive rates of application may destroy or damage a cash crop present in the area being treated. If, on the other hand, the rate of application is below the desired quantity, the desired effect of the application may be substantially minimized, and even possibly nullified. The rate of flow through a given orifice or nozzle varies as the square root of the pressure; thus for a modest change in delivery rates through a given orifice, a substantial range of pressures must be available. Therefore, extreme care must be taken in designing equipment for uniformly applying a quantity of material to the surface being treated. A most convenient technique of applying liquid soil treating materials is by use of a device containing a reservoir having a quantity of the liquid stored therein, and wherein means, such as a pumping source is available to assist in the withdrawal of liquid from the reservoir and thence discharge it into a delivery conduit at a certain pressure, this pumping source being capable of delivering any amount of fluid up to the maximum amount required in the spraying operation. A discharge conduit is utilized to transfer the fluids from the reservoir and into the area of the discharge nozzles. Along the discharge conduit, between the pressure source and the nozzles, a pressure regulating valve designed in accordance with the present invention is interposed, this valve utilizing by-pass means. This valve by monitoring the pressure in the system, controls the rate of application of the soil treating product. The pump therefor always operates at a minimum pressure level, this level being no greater than required by the immediate demands of the system.

In this connection, the pressure regulating valve is provided with an inlet chamber, and an adjustable orifice communicating with the discharge conduit leading therefrom, the orifice is adjusted to control the size thereof in accordance with a preselected aperture level or value, this value depending upon the general flow rate desired, and also depending upon the physical characteristics of the material being discharged. In addition to this feature, a second adjustment is provided which includes a pressure regulating mechanism with a by-pass for recycling a portion of the liquid received in the inlet chamber back to the reservoir, the relative quantity of material being passed through the by-pass and returning to the reservoir being dependent upon the flow rate from the pump and the pressure requirements at discharge. The pressure varies as the square of the speed of the vehicle. Therefore, the rate of application of the fluid to the area being treated is variable, in accordance with the speed at which the vehicle is being pulled across the surface being treated, the rate being dependent upon the pressure established by the pressure control valve. In addition to the other control functions, shut-off means are provided in order to interrupt or close off all flow through the system until discharge is desired. This, of course, permits the unit to be transported over areas where treatment is not desired or indicated, while still making it otherwise possible to maintain the spray unit under operating condition.

Briefly, the spray equipment system of the present invention includes a structure for supporting a reservoir, and a pump for providing a source of pressure to move the material from the reservoir, the pump being operated from a variable speed source, and accordingly proportioned to provide sufficient output for the material being pumped. A conduit is provided between the reservoir and the discharge or output nozzle area, the output being distributed from the spray system by various techniques, such as, for example, by use of a spray bar or the like. Means are provided to establish relative movement between the discharge portion of the system and the surface being treated. A pressure control or regulating valve having a by-pass is interposed along the conduit between the pump and the discharge area in order to control the pressure and rate of flow to the discharge area. The valve adjusts the pressure in response to the rate of relative movement, and includes an inlet chamber which is in communication with the discharge conduit, the rate of flow between the chamber and the discharge conduit being controlled within a broad range by a first orifice opening or setting. The inlet chamber is in further communication with a by-pass valve which monitors the excess portion of fluid back to the reservoir. The opening or setting of the by-pass valve is dynamic in nature, two parameters controlling the immediate setting; the first parameter being the immediate pressure available in the pressure chamber, the second parameter being the speed at which the vehicle is moving. In a soil treating system having the flow control arrangement of the present invention utilized therewith, the relative speed is determined by an idler wheel which is provided and which rotates at a rate dependent upon the speed at which the vehicle is traveling. The idler wheel is linked to a governor mechanism, and the governor is in turn linked to the control valve. In this manner, it is possible to control the pressure in the system, and accordingly the rate at which the material is discharged through the output nozzles on a speed-dependent basis. Thus, a wide range of area application spray rates are possible with one output nozzle or set of nozzles, the rate of area application being constant, up to the available maximum pressure. In addition to the various orifices, including the by-pass, an independent shut-off valve is provided. Thus the flow of fluids may be interrupted between the reservoir and the discharge nozzle or spray bar except when desired. For example, this feature permits the unit to be transported from one area, location or the like, to another as the user requires without being requisite that the pump be disconnected from the system. Continuous agitation is therefore possible.

Therefore, it is an object of the present invention to provide an improved area spray system which is adapted to discharge fluids from a reservoir at a certain preselected specific rate, the rate of discharge being variable and in accordance with the rate of relative movement of the spray system and the area being treated.

It is yet a further object of the present invention to provide an improved area spray system adapted to dispense various fluids at substantially uniform rates of coverage over the surface being treated, the system further including means for adjusting a discharge orifice in accordance with the physical properties such as viscosity and the like of the various materials being sprayed.

It is yet a further object of the present invention to provide an improved area spray system which is adapted to dispense fluids over a surface being treated at a substantially uniform rate of coverage, this system including a valve which is adapted to control the output pressure and accordingly the rate of discharge of fluid from the system, the system having a first orifice means which may be adjusted to provide a predetermined range of discharge rates dependent upon fluid characteristics, and by-pass means adapted to control the pressure in the system on a speed dependent basis, the by-pass means having an aperture or passageway for permitting excess material from a non-metering source to flow back to the reservoir, the magnitude or size of the aperture being dependent upon the pressure demand of the system based upon the immediate relative speed of travel of the application portion and the surface being treated.

Other and further objects of the present invention will become apparent to those skilled in the art upon a study of the following specification, appended claims, and accompanying drawings wherein:

FIGURE 1 is a top plan view of a vehicle having the area spray system of the present invention mounted thereon, a portion of the equipment being broken away, and also shown is a portion of a tractor which is being utilized to transport the spray system;

FIGURE 2 is a front elevational view of the equipment shown in FIGURE 1;

FIGURE 3 is a vertical sectional view taken along the line and in the direction of the arrows 3—3 of FIGURE 2, and showing, on a somewhat enlarged scale and partially in section, the speed monitoring or governor portion of the metering valve component of the system;

FIGURE 4 is a detail front elevational view of the metering valve component shown in FIGURE 3;

FIGURE 5 is a detail rear elevational view of the valve apparatus of the present invention;

FIGURE 6 is a horizontal sectional view taken along the line and in the direction of the arrows 6—6 of FIGURE 5, FIGURE 6 being drawn on a somewhat enlarged scale;

FIGURE 7 is a detail vertical sectional view of the selector orifice or static port portion of the valve apparatus of the present invention, and taken along the line and in the direction of the arrows 7—7 of FIGURE 6;

FIGURE 8 is a view similar to FIGURE 7, and being taken along the line and in the direction of the arrows 8—8 of FIGURE 6; and, FIGURE 9 is a partial vertical sectional view, on a somewhat enlarged scale, showing the speed responsive component of the metering valve shown in FIGURE 3.

In accordance with the preferred modification of the present invention, the area spray assembly shown in FIGURE 1, and generally designated 10 includes a flat vehicle or trailer bed 11 which is supported on the axle shaft 12 along with the ground engaging wheels 13 and 14. In order to transport the vehicle 11, a suitable hitch means or the like is provided at 15 for hitching the trailer to a suitable pulling vehicle such as a tractor or the like. A reservoir, tank or container 16 with a filler port 19 is mounted on the bed 11, and a pumping source is provided by the pump 17, the discharge capability range being at or above the certain predetermined maximum output level. The rotational energy or power for the pump 17 is taken from a power take-off shaft, the pump being shown on a farm tractor, as is conventional in the art. The pump 17 is in communication with the tank 16 by means of the intake conduit 18. A main delivery conduit 20 extends from the output of the rotary pump 17 through the pressure control valve generally designated 21, a second portion of the conduit system designated 20A extending from the pressure control valve to the discharge spray bar, nozzle bar, or the like 22. Spray nozzle bar 22 is provided with a plurality of nozzles or orifices for discharging the fluid from the reservoir 16 onto the surface being treated, particularly in the manner shown in FIGURE 2 of the drawings. A by-pass conduit 24 is adapted to recycle fluid from the pressure control valve back to the reservoir 16, the relative rates of flow between the discharge conduit 20A and the by-pass conduit 24 being, of course, controlled by the dynamic setting of the pressure control valve 21.

As indicated in FIGURES 1 and 2, an idler wheel 25 is provided along the surface of the main wheel 13, idler 25 being mounted for rotation about a central axis or shaft such as at 26, the shaft being mounted or secured within the sleeved housing 27. While the idler wheel 25 has been shown as being provided along the surface of a main wheel 13, it will be appreciated that an independently suspended wheel or sprocket and belt or chain means may be utilized in order to monitor the speed at which the vehicle is being transported. It is preferable, however, that the idler wheel be adapted to engage either the surface of the area being treated, or a ground engaging wheel which is not powered, since, when a slippery or muddy condition is encountered, a powered wheel will tend to give a false indication of speed to an idler wheel such as the wheel 25. A geared pulley wheel 28 is secured to the shaft 26 and is free to rotate therewith at a rate determined, of course, by the speed of rotation of the wheel 25. A chain belt 29 or the like is utilized to transmit the rotational energy from the pulley 28 to the second smaller driven pulley 30, the pulley 30 being keyed to governor control shaft 31. Governor control shaft 31 is utilized to drive the speed responsive governor assembly of the valve of the present invention, the speed of rotation of the shaft 31 being, of course, indicative of the speed at which the system is being transported across the surace being treated.

Attention is now directed to FIGURES 3, 6 and 9 of the drawings for a detailed description of the speed responsive governor portion of the present invention. Referring briefly to the operation of this portion of the apparatus, the rate of rotation of the shaft driving the governor mechanism will, in turn, determine the back pressure which resists opening of the by-pass valve or plunger 43 (see FIGURE 6). The governor or speed control portion of the apparatus is generally designated 35, the unit comprising a housing 36 retaining therein the rotating governor mechanism generally designated 37 together with the axially movable or slidable control rod 38 which is operatively associated therewith. As indicated previously, the control rod 38 is operatively connected to the plunger 34; this being accomplished by means of the pin 39, which connects to the pivotal link 40, link 40 being likewise secured by means of a pin to the end of axially slidable rod 41. The rod 41 comprises the actuating mechanism or linkage for the pilot valve generally designated 42, the rod 41 being disposed for axial movement within the sleeve area 43. A Teflon bushing or the like may be employed in order to reduce friction of the axial sliding movement of the rod 41 within the bushing 43. The pilot valve 42 includes a ball 44 which seats on the axially adjustable internally bored orifice member 45, the pressure existing between the ball 44 and the seat along the surface of the bored member 45 being determined by the force or compressional energy of the spring 46 together with the axial disposition of the bored member 45. The axial disposition of the bored member 45 may be adjusted by the positioning of the set-screw 47. A chamber area shown at 48 communicates with the internal bore of the orifice member 45 through the radial bores at 49, the chamber 48 being in communication with the pilot valve pressure chamber 50 by means of the passageway 51. A bleed-off channel is provided between the chamber 52 and the by-pass conduit 24 through 53 in order to control the flow of fluid which is permitted to pass through the pilot valve assembly 42. Pilot valve pressure chamber 50 is in communication with the inlet chamber to the metering valve, the pressure within the chamber 50 being determined to a substantial extent by the immediate pressure being exerted by the ball 44 against the opening in orifice member 45.

Referring now to the details of operation of the governor mechanism generally designated 37, particularly as shown in FIGURES 3 and 9, the shaft 31 which is driven by means of the sprocket 30 is mounted axially within the main housing 36 by a suitable sleeve bearing or the like as shown at 55. A suitable seal may be interposed between the housing 36 and the gear retaining hub 56, as indicated. The gear retaining hub 56 is secured to the shaft 31 by means of a set-screw, as indicated, although it will be appreciated that suitable keyway or the like may be utilized in lieu of the set-screw, as illustrated. A drive gear 57 is secured to the hub 56, the gear 57 meshing with a gear 58 to provide a substantial speed increase for the shaft 59 upon which gear 58 rotates. An increase in the range of about 30:1 is normally desired with respect to the ground speed for proper operation of the governor mechanism such as is shown at 37, this increase making it possible to acquire the forces necessary without requiring the mass necessary at slower speeds. This also permits the unit to be more compact. It will be appreciated, of course, that other ratios may be satisfactory when other assemblies, parameters, or the like are being utilized. Gear 58 is appropriately keyed for rotation with shaft 59, shaft 59 being adapted for rotation within the housing 36 by means of a bushing or bearing as shown at 59A.

Particular attention is now directed to FIGURE 9 of the drawings wherein the details of operation of the governor mechanism generally designated 37 are shown. At the opposite end of the shaft 59, and mounted for rotation therewith, is the arm yoke 60 of the governor mechanism generally designated 37. A suitable locking nut mechanism as at 61 is utilized to threadably engage the terminal end of the shaft 59 to mount the yoke 60 for rotation with the shaft 59. Suitable retainers, as desired, are interposed between the yoke member 60 and the shaft 59, as at 63.

Arm yoke 60 has the pivotally mounted arms 65—65 secured angularly symmetrically thereto by means of the pivot pins as at 66—66. In this connection, the arms 65—65 are adapted to be thrust outwardly by the centrifugal force generated from the rotation of the shaft 59. The centrifugal force which tends to pivot the arms 65—65 outwardly about the pins 66—66 must counteract the effect of the compression spring 68 which urges the governor shaft 38 inwardly toward the yoke member 60. Of course, suitable seating means is provided for the spring 68, along with suitable bearing means for the shaft 38 as illustrated generally at 68A. A suitable rotatable bearing plate surface as shown at 69 serves as a base for the pressure exerting cam-like surface 65A of the governor arms 65—65, a suitable bearing member 70 being interposed between the radially rotating surface 69 and the axially movable shaft 38. The cam surfaces 65A have a contour which matches the output pressure requirements of the system, as well as the compression on the pilot spring 46. If spring 46 has a linear response, cam surfaces 65A will have a contour of a square function relative to speed. Thus, if the relative speed doubles, the system pressure quadruples, as determined by the back pressure on spring 46. Inasmuch as the thrust provided by the centrifugal force acting on the governor arms 65—65 may be small or minimal, in order to assist in the calibration, a fine internally bored bearing surface such as molded polytetrafluoroethylene or the like, such as Teflon or the like is provided at 72 in order to radially retain or guide the stub shaft 71 which extends from the bearing surface 69. A similar fine bore is provided where the shaft 38 leaves the housing, a Teflon sleeve being used, if desired. The governor is accordingly isolated from the remainder of the fluid flow areas of the system. Thus, the reaction to the centrifugal force built up by the rotation of the governor arm 65 will be substantially exclusively that compressional force provided by the spring 68 together with the compressional force exerted by the spring member 46 of the pilot valve assembly 42, the frictional forces involved being, of course, substantially minimized. The speed of rotation of the shaft 59 will accordingly determine the magnitude of the centrifugal force urging the arms 65—65 outwardly, and accordingly this force will determine the axial positioning of the shaft 38. It is, of course, desirable that the compressional forces provided by the springs 68 and 46 be substantially linear within the range being utilized. Thus, the output of the governor 65 will be predictable, and the fluid output of the mechanism can be conveniently calibrated. As indicated previously, the axial position of the shaft 38 will determine, in part, the pressure available in chamber 50, this pressure being utilized as a parameter to adjust the opening available for the by-pass valve plunger 34 with its specific housing and seating arrangement.

Turning now to the remaining portion of the bypass control, the plunger 34 is adapted to seat against the flange area 75 of the housing member 76. Plunger 34 when open provides an aperture or access into the main by-pass chamber 78. The plunger 34 has a guide stem 79 which is mounted for axial movement within the bushing 80, the compression spring 81 being utilized to urge the plunger 34 into contact with the seat 75, and provide the force required to allow a starting pressure build-up in the system. A bleed hole 82 is arranged along the surface of the head of the valve 34 and provides for minimal fluid communication between the main pressure chamber leading from the pump source to the pilot valve pressure chamber 50. Thus, the pressure chamber 50 establishes the pressure head that the main portion of the plunger 34 is exposed to and thus the output pressure. A screen or the like is provided at 84 in order to reasonably protect the bleed hole 82 supplying fluid to the pilot valve 42 from grit or solids which may be contained in the solutions being sprayed, a retaining ring such as the ring 85 being utilized to hold the screen firmly in place. The design is fail-safe by virtue of the fact that should the screen clog completely flow through bleed hole 82 would stop and pressure in chamber 50 would drop allowing by-pass plunger 34 to open at the lowest system pressure. A flexible diaphragm 86 is interposed between the pilot valve pressure chamber 50 and the main pressure area, in order to provide a leakproof yet relatively frictionless seal between the moving valve and its stationary housing thus increasing the sensitivity and more closely controlling the relative rates of flow from the portions of the by-pass valve assembly.

The by-pass valve is accordingly adapted to maintain a pressure within the discharge line dependent upon vehicle speed by permitting a quantity of fluid to be re-cycled to the reservoir chamber 16 through a by-pass network. As the speed increases, a greater spraying pressure is required than is required at a lower rate of speed, the change in pressure being proportional to the square of the change in rate of speed; since pressure varies as the square of the flow rate through a given orifice or nozzle. For example, if the spraying speeds will normally vary from 4 m.p.h. to 8 m.p.h., a spraying pressure requirement of 25 p.s.i. at 4 m.p.h. will be 100 p.s.i. at 8 m.p.h. The pressure head required from pump 17 will be only that required by the spraying speed thus reducing pressure loading of the pump to a minimum The distribution of rates of flow through the portions of the by-pass system are arranged so that the main orifice valve may discharge sufficient fluid to accommodate the pressure drop required. When the main discharge orifice is closed, the by-pass must take all of the flow. It will be appreciated, therefore, that the response of the by-pass valve 34 is based substantially entirely on the pressure established in the pilot valve pressure chamber, the pressure response of the pilot valve 42 being related essentially to the speed of the equipment. The result of the two valves working in cooperative relationship is a substantially compensated or speed regulated pressure within the fluid receiving zone of the pressure control valve assembly.

Attention is now directed to FIGURES 6, 7 and 8 wherein the combined selector-control portions of the metering valve are illustrated. The housing 90 is secured to the housing 76 by means of a nipple coupling, as indicated. The valve includes a housing 90 which is adapted to receive the shaft 91 co-axially therewithin, along the sleeve portion 92. A suitable seal is required, if desired, at 94, the seal being disposed between the rod 91 and the sleeve 92. A hub and crank arm assembly 95 is secured to this shaft or rod 91 by a pin or the like as at 96, the crank 95 being adapted to control the relative angular disposition of the main valve orifice plate, and thereby control the extent of opening which exists between the chamber 98 and the outlet chamber 99. Chamber 99 is in communication with the discharge conduit 20A. The pipe receiving fitting 100 is bolted to the housing 90, as indicated, the fitting 100 having a passageway formed and defined by a pair of radially disposed ports 101 and 102. The shaft 90 carries an orifice baffle plate 104, plate 104 being adapted for rotation with the shaft 91. The plate 104 is provided with a pair of radially disposed ports 105 and 106 which are arranged in superimposed relationship to the ports 101 and 102 of the port of the plate 100. Thus, when properly angularly disposed along the axis of the rod 91, the openings defined by the ports 105 and 106 may coincide with at least a portion of that orifice defined by the ports 101 and 102. Thus, the orifice plate 104, when provided with a preselected angular position along the axis of rotation, which position may be defined by a pre-setting of the set screw 108, the rate of flow may be carefully controlled between the chambers 98 and 99. Of course, in addition, the orifice plate 104 may function as a shut-off valve unit, when flow is not desired, the plate merely being turned to an angular position wherein no portion of the ports 105 and 106 coincide with any portion of the ports 101 and 102. This disposition would be desired whenever the operator did not wish to have fluid discharging out of the spray bar. In order to maintain a contact pressure between the orifice plate 104 and the appropriate facing of the plate 100, a compression spring is provided as at 93, the spring extending between the end of the sleeve 92 and the surface of the plate 104. A pair of pins 97—97 are disposed radially within the shaft 91 and extend outwardly from the periphery thereof at ninety degrees relative positions to link orifice plate 104 with shaft 91, both radially and axially. As indicated in FIGURES 3 and 5, the crank assembly 95 is provided with a pair of control cables or ropes 109 and 110 which are adapted to be pulled, as desired, to generally control the angular disposition of the orifice plate 104 relative to the plate 100. An over-center actuating spring 112 is secured at one end to the crank 95, the other end being secured to the housing 90 of the valve assembly. Thus, when either cable 109 or 110 is pulled forwardly, the spring 112 will cause the crank 95 to be retained at the desired position, suitable stop means, such as set-screw 108, being preferably provided in order to hold the crank 95 in a desired angular disposition.

In operation, the operator initially fills the reservoir 16 with the desired spray materials and couples the inlet line 18 to the pump 17 which is operatively connected with the power take-off shaft of the tractor unit. The line 20 is then coupled to the output of the pump 17. The selector valve setting is then determined by proper setting and locking of the set-screw 108, the setting being determined by the flow rate desired and by the physical properties including viscosity, density and the like of the material being sprayed. At the start of the spraying operation, that is, when the vehicle is in place and moving, the operator pulls cord 109 in order to move the selector and shut-off valve into proper angular disposition, this operation preferably occurring as the equipment is moving at the minimum speed required for application. The movement of the equipment causes rotation of the idling wheel 25, the energy of rotation then being transmitted along to the governor mechanism generally designated 37. Depending upon the rate of speed at which the vehicle is moving, the governor will cause the shaft 38 to assume an axial position which is determined by the disposition of the governor arm 65. Axial movement or positioning of the shaft 38 creates a certain predetermined compressional force in the spring 46 which determines, in turn, the force exerted by the ball 44 against its seat. This force is in turn reflected in the operating pressure of the system. The pressure available in the chamber 50 will determine the position assumed by the plunger 34 relative to the seat area 75, and correspondingly the pressure in chamber 98. Thus, the axial position of the plunger 34, particularly with regard to the opening formed between the face thereof and the seat 75, together with the rate at which the fluid may be bled outwardly through the pilot valve 42, will determine the ambient pressure which exists in the chamber 98. Thus, the pressure will remain at a preselected level determined by the rate of speed of the vehicle. As the speed is increased, the pressure on the ball 44 is proportionately increased and the ambient pressure in the pilot valve pressure chamber 50 is accordingly raised. On the other hand, as the speed is decreased, the rod 41 is retracted from the compressional spring 46 and the force exerted against the ball is substantially less. This permits, of course, a greater quantity of fluid to pass through the variable speed by-pass portion of the by-pass network, thus decreasing the ambient pressure available in pilot valve pressure chamber 50, and permitting a greater opening of the by-pass valve plunger 34. The pressure head available for the nozzle or discharge outlet area is therefore maintained as a function of vehicle speed.

It will be appreciated by those skilled in the art that the various specific embodiments disclosed herein are for purposes of illustration only and are not to be otherwise construed as a limitation upon the scope of the present invention.

What is claimed is:

1. In a fluid discharge system adapted to dispense fluids over a surface to be treated at a substantially uniform rate of coverage and having a reservoir for storing such fluids, pressure supply means for delivering said fluids at a certain pressure falling within a certain predetermined range of pumping pressures, fluid discharge means, means for establishing relative movement between said fluid discharge means and the surface being treated, conduit means extending between said reservoir and said fluid discharge means, and pressure control valve means disposed along the said conduit for controlling the pressure in the discharge of said fluid; said pressure control valve means including a body with an inlet and an outlet and having a passageway therein, an orifice plate disposed adjacent to said passageway and movable relative thereto, selector means coupled with said orifice plate for positioning said plate to adjust the size of the aperture formed by said orifice plate along said passageway, a by-pass valve means responsive to the speed of said vehicle, said by-pass valve means adapted to control the flow of fluids therethrough and being arranged for reciprocal opening and closing motion, the opening motion thereof being opposed by a certain pressure chamber, said speed responsive means being adapted to sense the speed of said vehicle and being coupled with said certain pressure chamber, said speed responsive means having a flow control means adapted to maintain the pressure in certain pressure chamber at a level proportional to the square of the speed of said vehicle.

2. The fluid discharge system as defined in claim 1 being particularly characterized in that adjustment means are provided for said speed responsive means in order to control the pressure in said certain pressure chamber within a certain predetermined range.

3. The fluid discharge system as defined in claim 1 being particularly characterized in that shut-off valve means are provided to interrupt flow of fluids to said fluid discharge means.

4. The fluid discharge system as defined in claim 1 being particularly characterized in that adjustable orifice means are provided along said fluid discharge means to pre-set the flow rate to said fluid discharge means for a certain predetermined downstream pressure.

5. The fluid discharge system as defined in claim 1 being particularly characterized in that said by-pass means may receive the entire quantity of fluid delivered from said pressure supply means.

6. The fluid discharge system as defined in claim 1 being particularly characterized in that diaphragm means are provided to separate the said certain pressure chamber from said pressure control valve inlet.

7. The fluid discharge system as defined in claim 1 being particularly characterized in that said pressure supply means are isolated from said pressure control valve means.

8. The fluid discharge system as defined in claim 1 being particularly characterized in that said pressure source and said pressure control means are independently energized and actuated.

9. The fluid discharge system as defined in claim 1 being particularly characterized in that means are provided by series staging of the control valving to accommodate large variations in flow with minimal variations in control pressures.

10. The fluid discharge system as defined in claim 1 being particularly characterized in that screen filter means are disposed between said inlet and said pressure chamber.

11. The fluid discharge system as defined in claim 1 being particularly characterized in that said speed responsive means include rotating means for creating centrifugal working forces.

12. The fluid discharge system as defined in claim 11, being particularly characterized in that said rotating means for creating centrifugal working forces is bi-directional in operation.

References Cited by the Examiner

UNITED STATES PATENTS

| | | | |
|---|---|---|---|
| 1,856,825 | 5/1932 | Alphonso | 137—625.31 |
| 2,031,262 | 2/1936 | Hill | 239—156 |
| 2,247,227 | 6/1941 | Findley | 251—208 |
| 2,369,522 | 2/1945 | Bazille | 251—208 |
| 2,521,264 | 9/1950 | Stark | 137—491 |
| 2,576,516 | 11/1951 | Jurs | 137—491 |
| 3,090,394 | 5/1963 | Page | 137—56 |

M. HENSON WOOD, Jr., *Primary Examiner.*